(12) United States Patent
Staffeldt et al.

(10) Patent No.: US 11,611,082 B2
(45) Date of Patent: Mar. 21, 2023

(54) GRID ASSEMBLY FOR A PLATE-SHAPED BATTERY ELECTRODE OF AN ELECTROCHEMICAL ACCUMULATOR BATTERY

(71) Applicant: Clarios Germany GmbH & Co. KG, Hannover (DE)

(72) Inventors: Armin Staffeldt, Lauenbruck (DE); Ingo Koch, Hameln (DE); Bernd Ide, Hannover (DE); Ornwasa Traisigkhachol, Ronnenberg (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 129 days.

(21) Appl. No.: 17/068,575

(22) Filed: Oct. 12, 2020

(65) Prior Publication Data

US 2021/0135240 A1    May 6, 2021

Related U.S. Application Data

(63) Continuation of application No. 16/173,906, filed on Oct. 29, 2018, now Pat. No. 10,840,515, which is a
(Continued)

(30) Foreign Application Priority Data

Oct. 8, 2013   (DE) .......................... 102013111109.2

(51) Int. Cl.
*H01M 4/02* (2006.01)
*H01M 4/74* (2006.01)
(Continued)

(52) U.S. Cl.
CPC ............... *H01M 4/74* (2013.01); *H01M 4/72* (2013.01); *H01M 4/73* (2013.01); *H01M 2004/028* (2013.01)

(58) Field of Classification Search
None
See application file for complete search history.

(56) References Cited

U.S. PATENT DOCUMENTS

| 669,085 A | 3/1901 | Heidel |
| 1,129,690 A | 2/1915 | Knobloch |
| (Continued) | | |

FOREIGN PATENT DOCUMENTS

| CN | 1279824 A | 1/2001 |
| CN | 1515043 A | 7/2004 |
| (Continued) | | |

OTHER PUBLICATIONS

Amendment and Response dated Dec. 30, 2009, from U.S. Appl. No. 11/984,666.
(Continued)

*Primary Examiner* — Jacob B Marks
(74) *Attorney, Agent, or Firm* — Boardman & Clark LLP

(57) ABSTRACT

The invention relates to a grid arrangement for a plate-shaped battery electrode of an electrochemical accumulator having a frame and a grid arranged thereon, wherein the frame comprises at least one upper frame element having a connecting lug of the battery electrode disposed on its side facing away from the grid, and wherein the grid is at least formed by horizontal bars, which are bars extending substantially horizontally, and vertical bars, which are bars extending substantially vertically, wherein at least some of the vertical bars are arranged at different angles to one another in the shape of a fan. The invention further relates to an accumulator.

18 Claims, 4 Drawing Sheets

Related U.S. Application Data continuation of application No. 15/027,592, filed as application No. PCT/EP2014/071556 on Oct. 8, 2014, now Pat. No. 10,170,768.

(51) Int. Cl.
  *H01M 4/72* (2006.01)
  *H01M 4/73* (2006.01)

(56) References Cited

U.S. PATENT DOCUMENTS

| | | |
|---|---|---|
| 1,347,873 A | 7/1920 | Rabe |
| 1,364,760 A | 1/1921 | Holland et al. |
| 1,381,008 A | 6/1921 | Polk |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Scott et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De et al. |
| 2,282,760 A | 5/1942 | Hauel |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 2,882,760 A | 4/1959 | Leiter |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill |
| 3,398,024 A | 8/1968 | Barnes et al. |
| 3,408,236 A | 10/1968 | Hartesveldt |
| 3,453,145 A | 7/1969 | Duddy |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,690,950 A | 9/1972 | Wheadon et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,909,293 A | 9/1975 | Hammond et al. |
| 3,923,545 A | 12/1975 | Margulies et al. |
| 3,926,247 A | 12/1975 | Geiger et al. |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Feagin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkier et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,614,630 A | 9/1986 | Pluim, Jr. |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | Mcloughlin et al. |
| 4,906,540 A | 3/1990 | Hoshihara et al. |
| 4,932,443 A | 6/1990 | Karolek et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze et al. |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Henning et al. |
| 5,601,953 A | 2/1997 | Schenk |
| 5,604,058 A | 2/1997 | Wirtz |
| 5,611,128 A | 3/1997 | Wirtz |
| 5,643,696 A | 7/1997 | Rowlette |
| 5,660,600 A | 8/1997 | Vyas |

(56) References Cited

U.S. PATENT DOCUMENTS

| | | |
|---|---|---|
| 5,660,946 A | 8/1997 | Kump et al. |
| 5,691,087 A | 11/1997 | Rao et al. |
| 5,834,141 A | 11/1998 | Anderson et al. |
| 5,851,695 A | 12/1998 | Misra et al. |
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,274 A | 9/1999 | Dobie et al. |
| 5,958,625 A | 9/1999 | Rao |
| 5,989,749 A | 11/1999 | Kao et al. |
| 6,026,722 A | 2/2000 | Lopez Ascaso et al. |
| 6,037,081 A | 3/2000 | Kashio et al. |
| 6,057,059 A | 5/2000 | Kwok et al. |
| RE36,734 E | 6/2000 | Binder et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 | 1/2001 | Rao et al. |
| 6,203,948 B1 | 3/2001 | Kao et al. |
| 6,245,462 B1 | 6/2001 | Kao et al. |
| 6,267,923 B1 | 7/2001 | Albert et al. |
| 6,274,274 B1 | 8/2001 | Schaeffer et al. |
| 6,291,097 B1 | 9/2001 | Barker et al. |
| 6,291,104 B1 | 9/2001 | Yoshihara et al. |
| 6,312,852 B1 | 11/2001 | Wagner |
| 6,342,110 B1 | 1/2002 | Palumbo |
| 6,348,283 B1 | 2/2002 | Mas et al. |
| 6,351,878 B1 | 3/2002 | Rao |
| RE37,804 E | 7/2002 | Mattan |
| 6,419,712 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,592,686 B2 | 7/2003 | Palumbo |
| 6,649,306 B2 | 11/2003 | Prengaman |
| 6,749,950 B2 | 6/2004 | Zhang |
| 6,755,874 B2 | 6/2004 | Chen et al. |
| 6,797,403 B2 | 9/2004 | Clark et al. |
| 6,833,218 B2 | 12/2004 | Mann |
| 6,921,611 B2 | 7/2005 | Schaeffer et al. |
| 6,953,641 B2 | 10/2005 | Chen |
| 7,398,581 B2 | 7/2008 | Chen |
| 7,767,347 B2 | 8/2010 | Kao et al. |
| 7,799,463 B2 | 9/2010 | Schaeffer et al. |
| 8,034,488 B2 | 10/2011 | Schaeffer et al. |
| 9,368,800 B2 | 6/2016 | Harker et al. |
| 10,170,768 B2 | 1/2019 | Staffeldt et al. |
| 10,840,515 B2 | 11/2020 | Staffeldt et al. |
| 2002/0015891 A1 | 2/2002 | Schaeffer et al. |
| 2002/0088515 A1 | 7/2002 | Aust et al. |
| 2002/0182487 A1 | 12/2002 | Wirtz |
| 2003/0059674 A1 | 3/2003 | Mann et al. |
| 2003/0096170 A1 | 5/2003 | Fujiwara et al. |
| 2004/0033157 A1 | 2/2004 | Schaeffer et al. |
| 2004/0038129 A1 | 2/2004 | Mann |
| 2004/0187986 A1 | 9/2004 | Schaeffer |
| 2005/0112470 A1 | 5/2005 | Taylor et al. |
| 2005/0150092 A1 | 7/2005 | Chen |
| 2005/0164091 A1 | 7/2005 | Schaeffer et al. |
| 2006/0213055 A1 | 9/2006 | Fujiwara et al. |
| 2007/0111089 A1 | 5/2007 | Swan |
| 2008/0289161 A1 | 11/2008 | Chen |
| 2009/0291359 A1 | 11/2009 | Wirtz et al. |
| 2010/0266903 A1 | 10/2010 | Kao et al. |
| 2010/0304219 A1 | 12/2010 | Schaeffer et al. |
| 2012/0047719 A1 | 3/2012 | Schaeffer et al. |
| 2012/0058394 A1 | 3/2012 | Schaeffer et al. |
| 2013/0115509 A1* | 5/2013 | Taylor .................... H01M 4/82 429/211 |

FOREIGN PATENT DOCUMENTS

| | | |
|---|---|---|
| CN | 1833896 A | 9/2006 |
| CN | 101233635 A | 7/2008 |
| CN | 201514971 U | 6/2010 |
| CN | 201741750 U | 2/2011 |
| DE | 2528688 A1 | 1/1977 |
| DE | 8013625 U1 | 11/1980 |
| DE | 3045683 A1 | 6/1982 |
| EP | 0029788 A1 | 6/1981 |
| EP | 0065996 A1 | 12/1982 |
| EP | 0348702 A1 | 1/1990 |
| EP | 0589549 A1 | 3/1994 |
| EP | 0795917 A2 | 9/1997 |
| EP | 0969108 A1 | 1/2000 |
| EP | 1041164 A1 | 10/2000 |
| GB | 570953 A | 7/1945 |
| GB | 1376162 A | 12/1974 |
| GB | 1377039 A | 12/1974 |
| GB | 2127614 A | 4/1984 |
| JP | 56-110578 | 1/1955 |
| JP | 58-155660 | 9/1958 |
| JP | S39-11225 | 4/1964 |
| JP | 50028638 | 3/1975 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60-78570 | 5/1985 |
| JP | 60143570 | 7/1985 |
| JP | 60-150556 | 8/1985 |
| JP | 60-167267 | 8/1985 |
| JP | 60167268 | 8/1985 |
| JP | 60198055 | 10/1985 |
| JP | 61124052 | 6/1986 |
| JP | S62147653 U | 7/1987 |
| JP | 63213264 | 9/1988 |
| JP | 11213993 | 8/1990 |
| JP | 2297864 | 12/1990 |
| JP | H04-196060 | 7/1992 |
| JP | H05-166512 A | 7/1993 |
| JP | 07065822 | 3/1995 |
| JP | 60150556 | 8/1995 |
| JP | 08-17438 | 1/1996 |
| JP | 3030260 U | 2/1996 |
| JP | 8083617 | 3/1996 |
| JP | 08-213023 | 8/1996 |
| JP | 8287905 | 11/1996 |
| JP | 09-231995 | 9/1997 |
| JP | 10284085 | 10/1998 |
| JP | H11054115 | 2/1999 |
| JP | H11512975 A | 11/1999 |
| JP | 2000164223 A | 6/2000 |
| JP | 2000340235 A | 12/2000 |
| JP | 2001229920 A | 8/2001 |
| JP | 2001-524736 | 12/2001 |
| JP | 2002-260716 | 9/2002 |
| JP | 2003036852 A | 2/2003 |
| JP | 2003178760 A | 6/2003 |
| JP | 2004165149 A | 6/2004 |
| JP | 2004-521145 | 7/2004 |
| JP | 2004196060 A | 7/2004 |
| JP | 2004199951 A | 7/2004 |
| JP | 2004253324 A | 9/2004 |
| JP | 2008542997 A | 11/2008 |

(56) References Cited

FOREIGN PATENT DOCUMENTS

| WO | 199927595 | | 6/1999 |
|---|---|---|---|
| WO | 0104977 | A1 | 1/2001 |
| WO | 0104978 | A1 | 1/2001 |
| WO | 2001004977 | | 1/2001 |
| WO | 2001053549 | | 7/2001 |
| WO | 2002015296 | | 2/2002 |
| WO | 2002054513 | | 7/2002 |
| WO | 2006127575 | A1 | 11/2006 |
| WO | 2008109429 | A2 | 9/2008 |
| WO | 2009150485 | A1 | 12/2009 |

OTHER PUBLICATIONS

Chinese Patent Office, Office Action (w/English Translation) dated Jul. 6, 2009, for Chinese Patent Appln. No. 200680017715.1 based on PCT/US06/19686, 12 pp.
U.S. Appl. No. 09/898,660 titled "Modification of the Shape/Surface/Finish of Battery Grid Wires to Improve Paste Adhesion," by Schaeffer et al., filed Jul. 2, 2001.
Final Office Action dated May 19, 2004 from U.S. Appl. No. 09/755,337.
International Search Report and Written Opinion dated Jul. 1, 2011, for PCT/US11/026836.
International Search Report and Written Opinion dated Jul. 24, 2013, for PCT/US12/62698 filed Oct. 31,2012.
International Search Report and Written Opinion dated Oct. 5, 2006 for PCT/US06/19686, 2 pp.
International Search Report dated Aug. 11, 2000, for PCT/US00/12569.
International Search Report dated Aug. 19, 2002 for PCT/US02/00390, 7 pages.
International Search Report dated Mar. 11, 1999, for PCT/US98/24345, filed Mar. 3, 1999, 2 pp.
International Search Report dated Oct. 12, 2000 for PCT/US00/18313.
International Search Report dated Oct. 6, 1999 for PCT/US99/13291.
International Search Report dated Oct. 9, 2000, for PCT/US00/18144.
Non-final Office Action dated Nov. 19, 2003, from U.S. Appl. No. 09/755,337.
Office Action dated Apr. 23, 2008 for EPO Appln No. 06770804.0-2119, 5 pp.
Office Action dated Aug. 5, 2009 (w/English Translation), for Chinese Patent Appln. No. 20060017715.1.
Office Action dated Jan. 19, 2010, from Brazil Patent Application No. PI 0206343-3 (w/English Translation).
Office Action dated Jan. 21, 2009, for EPO Appln No. 06770804.0-2119, 3 pp.
Office Action dated Jan. 7, 2003 for U.S. Appl. No. 09/755,337.
Office Action dated Jun. 18, 2003 for U.S. Appl. No. 09/755,337.
Office Action dated Mar. 24, 2003 for U.S. Appl. No. 09/898,660.
Office Action dated May 1, 2003 for U.S. Appl. No. 09/898,660.
Office Action dated Sep. 16, 2002, for U.S. Appl. No. 09/755,337.
Office Action dated Sep. 30, 2009, from U.S. Appl. No. 11/984,666.
Patent Abstract for AU 275685.
Reply and Amendment dated Feb. 12, 2004 from U.S. Appl. No. 09/755,337.
Reply and Amendment dated Jul. 19, 2004 from U.S. Appl. No. 09/755,337.
Response dated May 28, 2009 to Office Action for EPO Appln. No. 067707804.0-2119, 9 pp.
Response dated Oct. 28, 2008 to Office Action for EPO Appln. No. 06770804.0-2119, 5 pp.
Response dated Sep. 23, 2009, for Chinese Patent Appln. No. 20060017715.1.
Chen, Yu-Lin, "Method for Making an Alloy Coated Battery Grid," U.S. Appl. No. 09/755,337.
Goodman, S., "Plates with improved conductivity," Batteries International, pp. 88-89 (no month).
Ishikawa, et al., "A punched grid production process for automotive batteries," PB 80, 7th International Conference (1980).
Megger, "Failure Modes—Lead Acid (flooded) failure modes," Battery Testing Guide, p. 7.
Perez, "The Complete Battery Book," TAB Books, Inc., 191 pp., 1985 (no month).
www.fireflyenergy.com, "Traditional Lead Acid Battery Shortcomings".
International Search Report and Written Opinion of the International Searching Authority dated Dec. 18, 2014, for PCT/EP2014/071556 filed Oct. 8, 2014; English translation of International Search Report included.

\* cited by examiner

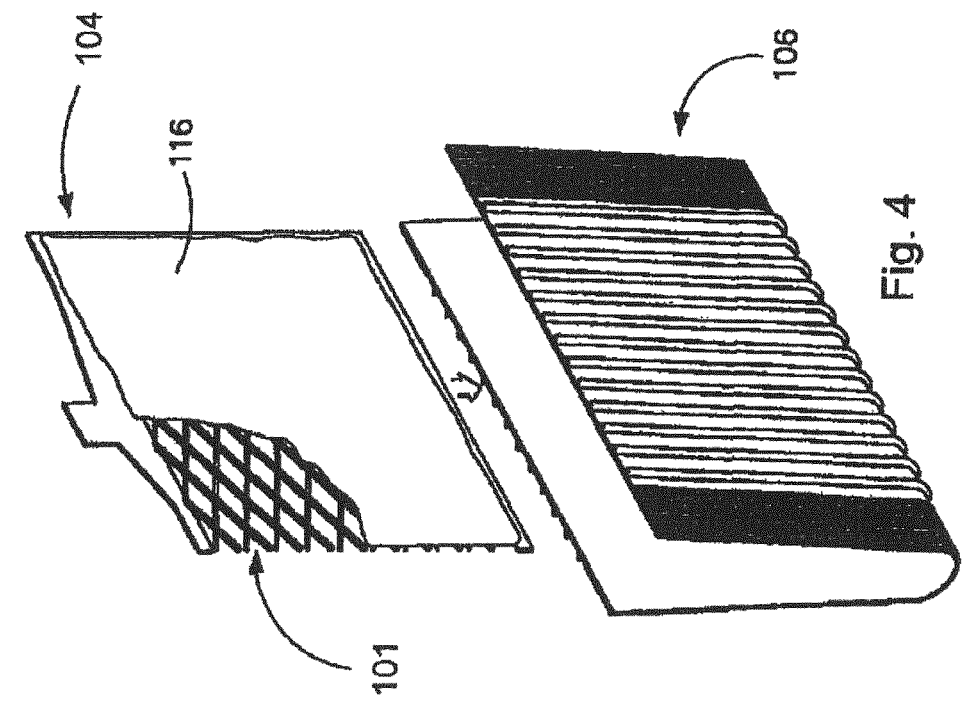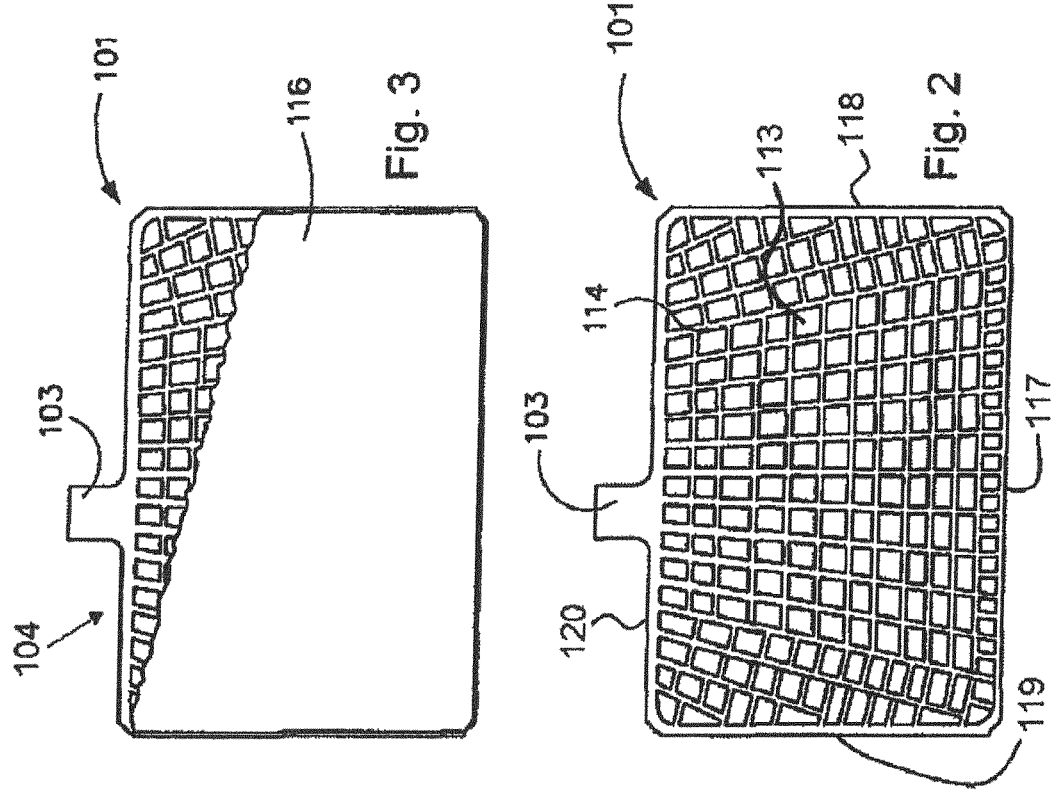

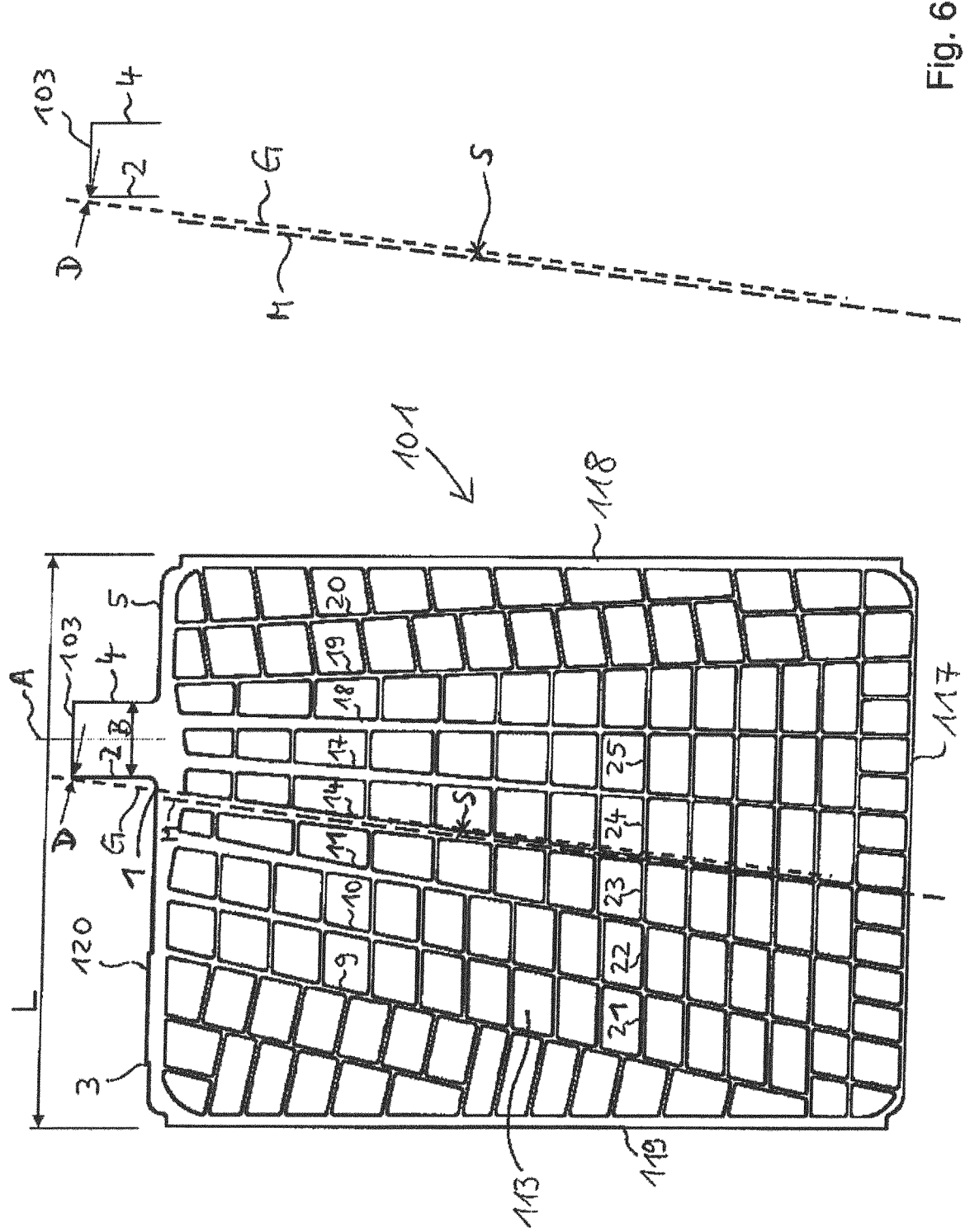

GRID ASSEMBLY FOR A PLATE-SHAPED BATTERY ELECTRODE OF AN ELECTROCHEMICAL ACCUMULATOR BATTERY

CROSS-REFERENCE TO RELATED APPLICATIONS

This application claims priority to and is a continuation of U.S. Nonprovisional application Ser. No. 16/173,906 entitled GRID ASSEMBLY FOR A PLATE-SHAPED BATTERY ELECTRODE OF AN ELECTROCHEMICAL ACCUMULATOR BATTERY filed Oct. 29, 2018, now U.S. Pat. No. 10,840,515, which claims priority to and is a continuation of U.S. Nonprovisional application Ser. No. 15/027,592 entitled GRID ASSEMBLY FOR A PLATE-SHAPED BATTERY ELECTRODE OF AN ELECTROCHEMICAL ACCUMULATOR BATTERY filed Apr. 6, 2016, now U.S. Pat. No. 10,170,768, which is a national stage filing of International Application No. PCT/EP2014/071556 entitled GRID ARRANGEMENT FOR A PLATE-SHAPED BATTERY ELECTRODE OF AN ELECTROCHEMICAL ACCUMULATOR AND ACCUMULATOR filed Oct. 8, 2014, which claims priority to German patent application DE 102013111109.2 filed Oct. 8, 2013, the contents of each of which are hereby incorporated by reference in their entirety.

FIELD OF THE INVENTION

The invention relates to a grid arrangement for a plate-shaped battery electrode of an electrochemical accumulator in accordance with the preamble of claim 1. The invention further relates to an accumulator in accordance with claim 7.

BACKGROUND

Generally speaking, the invention relates to the field of electrochemical accumulators having plate-shaped battery electrodes, also known as electrode plates. Such accumulators are particularly manufactured as lead-acid batteries. Grid arrangements for such battery electrodes are described for example in DE 10 2008 029 386 A1 and WO 01/04977 A1. Such grid arrangements are usually made of lead. Due to rising raw material prices and with the objective of reducing the weight of electrochemical accumulators, minimizing the amount of lead used is desirable.

The invention is thus based on the task of specifying an optimized grid arrangement with which the amount of lead needed can be reduced without any impairing of performance.

SUMMARY

This task is solved in accordance with claim 1 by a grid arrangement for a plate-shaped battery electrode of an electrochemical accumulator having a frame and a grid arranged thereon, wherein the frame comprises at least one upper frame element having a connecting lug of the battery electrode disposed on its side facing away from the grid, and wherein the grid is at least formed by horizontal bars, which are bars extending substantially horizontally, and vertical bars, which are bars extending substantially vertically, wherein at least some of the vertical bars are arranged at different angles to one another in the shape of a fan, and having at least one, some or all of the following a), b), c), d) features:

a) a straight line which runs through the center of gravity of the grid arrangement and is a parallel to the central axis of the vertical bar having the shortest distance to the grid arrangement's center of gravity, passes the connecting lug at a distance of less than 15%, in particular less than 10%, of the connecting lug width, or intersects the connecting lug, b) a straight line which runs through the center of gravity of the grid arrangement and is a parallel to the central axis of the vertical bar having the shortest distance to the grid arrangement's center of gravity, intersecting the upper frame element at a point which is less than 15%, particularly less than 10%, of the length of the upper frame element away from a vertical central axis of the connecting lug, c) the sum of all the angles of those vertical bars which intersect both the upper as well as the lower frame element of the grid arrangement, or at least would intersect in mathematical extension, is greater than 7°, wherein the angles are defined in terms of an axis extending exactly vertically, d) the sum of the angles of the outermost left and outermost right vertical bar intersecting both the upper as well as the lower frame element of the grid arrangement, or at least would intersect in mathematical extension, is greater than 7°, wherein the angles are defined in terms of an axis extending exactly vertically.

In simplified terms, the grid arrangement according to the invention distinguishes itself from known grid arrangements by the arrangement of the vertical bars as a whole being canted or tilted toward the connecting lug. This enables on the one hand the desired material savings in raw lead material, along with the accompanying weight savings, and additionally, despite economizing on the raw material, even further improved electrical conductivity. The inventive grid arrangement thus enables the providing of an accumulator which weighs less than known accumulators and yet exhibits better electrical performance data.

The cited modified spatial orientation of the vertical bars can be rendered pursuant to one, multiple or all of the a), b), c), d) features of claim 1.

As per feature a) and b), a straight line is thereby defined through which the grid arrangement's center of gravity runs. The grid arrangement's center of gravity is to be understood, as commonly accepted in physics, as the center of mass of the grid arrangement, including the connecting lug. The center of mass of a body is the mass-weighted average of its mass point positions. The grid arrangement is usually made of relatively homogeneous lead material such that the center of mass then also corresponds to the geometrical center of gravity. The cited straight line running through the grid arrangement's center of gravity is moreover a parallel to the central axis of the vertical bar at the shortest distance from the grid arrangement's center of gravity. Thus, the vertical bar situated closest to the center of gravity needs to be determined; the cited straight line is a parallel to its central axis. The central axis is the longitudinal axis of the vertical bar, so to speak, that which runs dead center along the vertical bar in the longitudinal direction, thus substantially vertically. The central axis can inasmuch also be referred to as bisecting the vertical bar.

According to feature a), the straight line can pass the connecting lug at a certain distance or intersect it. If the straight line passes the connecting lug, it has no point of intersection with the connecting lug. According to feature b), the defined straight line similarly intersects the upper frame element at a specific point defined in relation to the vertical central axis of the connecting lug as previously clarified. To be understood as the vertical central axis in this case is an axis running exactly vertically at the dead center of the connecting lug.

Insofar as the usage of terms such as horizontally, vertically, above, below and/or horizontal or vertical, these terms refers to the mounting orientation of the battery electrode in an electrochemical accumulator when in normal position for specification-compliant use. As a rule, the specification-compliant normal position of the accumulator is with the bottom of the accumulator being in a horizontal position.

Where angles are specified in degrees (e.g. 7°), the specifications refer to an overall circular dimension of 360°.

According to one advantageous further development of the invention, the vertical bars arranged in the manner of a fan exhibit an angular difference of less than 5° between adjacent vertical bars. This allows further optimizing of the grid arrangement in terms of electrical performance as well as the material quantity and thus the weight.

According to one advantageous further development of the invention, the connecting lug is arranged asymmetrically on the upper frame element. The connecting lug has a first vertical side, disposed on the side of the longer leg of the upper frame element, whereby the straight line according to feature a) of claim 1 passes or intersects the connecting lug at its first vertical side and/or the point at which the straight line according to feature b) of claim 1 intersects the upper frame element is situated in the region of the upper frame element's longer leg. This thereby further optimizes the electrical conductivity as well as the need for material and the weight of the grid arrangement. The cited straight line is then situated on the side of the connecting lug's inner lug corner as it were; i.e. the corner facing the longer leg of the upper frame element.

According to one advantageous further development of the invention, the grid arrangement is a stamped lead grid. According to one advantageous further development of the invention, the grid arrangement is designed as a positive grid arrangement for a positive battery electrode.

The grid arrangement at least comprises the upper frame element. The grid arrangement can additionally comprise a lower frame element, a left as well as a right frame element, wherein the upper frame element is connected to the lower frame element by means of the left and right side frame elements. The grid is thereby arranged with the frame. Doing so provides a grid arrangement of increased robustness including in its lower regions.

The task cited at the outset is additionally solved pursuant to claim 7 by an accumulator having a plurality of plate-shaped battery electrodes arranged into one or more electrode plate packs, wherein one, multiple or all of the battery electrodes comprise a grid arrangement in accordance with one of the preceding claims.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 2 is a grid arrangement;

FIG. 3 is a grid arrangement provided with an active mass;

FIG. 4 is the encasing of a grid arrangement provided with an active mass within a separator;

FIG. 6 is a top view of a further inventive grid arrangement.

The figures make use of the same reference numerals for equivalent elements.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
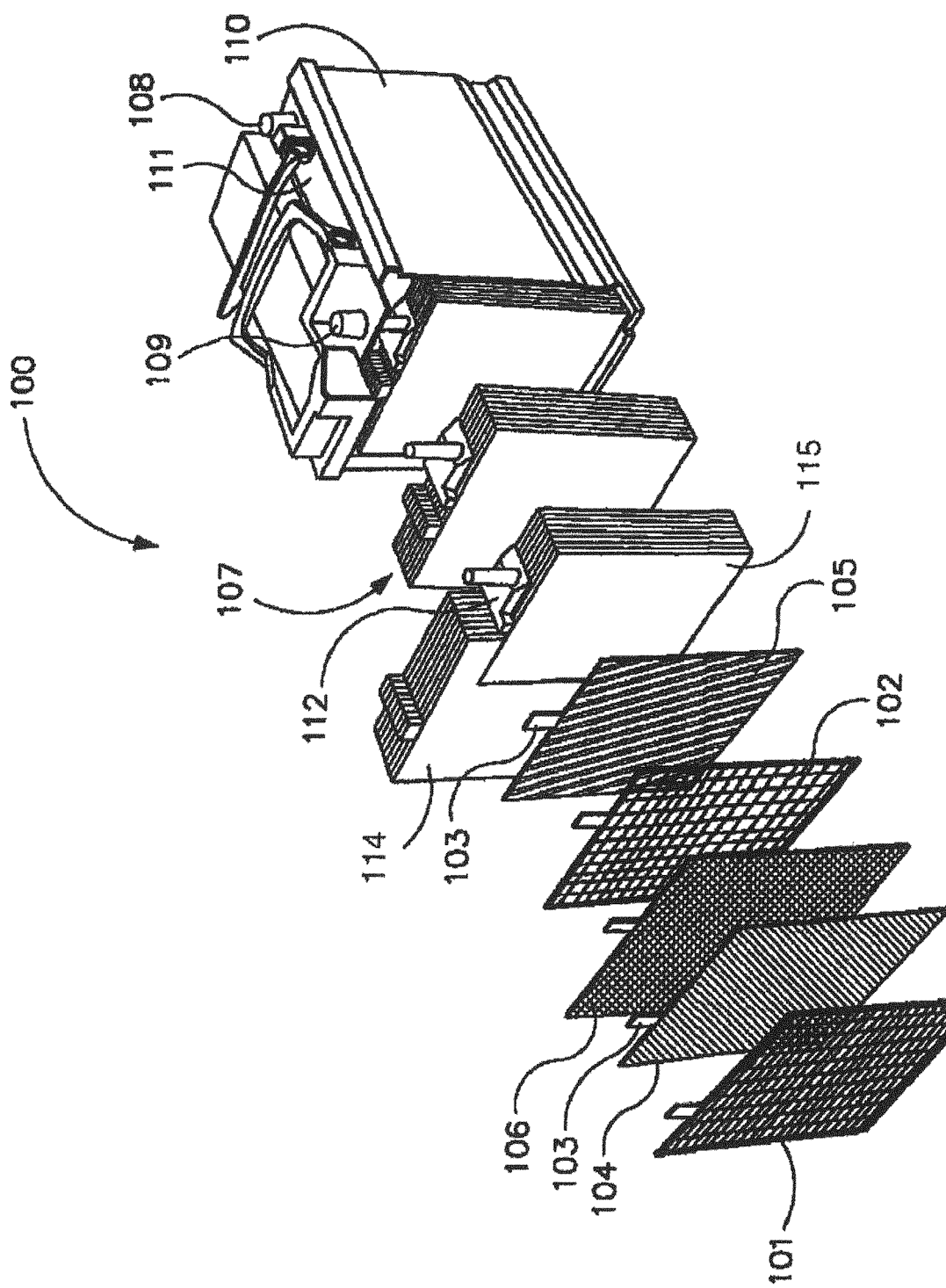
FIG. 1 is a semi-exploded view of an accumulator and its structural elements.

FIG. 1 illustrates an example basic design of an accumulator 100 according to the invention. The accumulator 100 can in particular be designed as a lead-acid battery having liquid electrolyte, for example in the form of sulfuric acid. The accumulator 100 has a housing 110 in which or more or more plate packs 107 are arranged. The accumulator 100 has a fixed number of plate packs 107 based on its number of cells. The plate packs 107 are respectively arranged in individual holding chambers of the housing 110 separated from one another by partitions. The plate packs 107 are connected together into a series connection within the housing 110 by internal connecting elements not depicted in FIG. 1. The positive plates at the one end of the plate pack and the negative plates at the other end of the plate pack are electrically connected to respective external terminals 108, 109 located in a cover part 111 of the accumulator housing 110. The electrical energy of the accumulator 100 is supplied to electrical loads through terminals 108, 109.

The plate packs 107 comprise respectively alternating positive and negative electrode plates. The negative electrode plates are depicted as negative plate group 115, the positive electrode plates as positive plate group 114. FIG. 1 includes a depiction of individual electrode plates for illustrative purposes; i.e. a negative electrode plate 105 comprising a negative flat lead grid 102 and a positive electrode plate 104 comprising a positive flat lead grid 101. The positive electrode plate 104 and the negative electrode plate 105 depicted in FIG. 1 already exhibit a pasting with active mass, same covering the individual grid bars and cutouts. The positive and/or negative lead grid comprise(s) a plurality of grid bars and a plurality of window-like cutouts formed between the grid bars. The positive and/or negative lead grid 101, 102 can be produced for example in a stamping process or by means of other methods such as casting and/or rolling.

The positive electrode plate 104 is additionally separated from the negative electrode plate 105 by a separator material 106. The separator material 106 can in particular be formed into the shape of a pouch to accommodate the positive electrode plate 104 and separate it from adjacent electrode plates.

The positive electrode plates 104 each comprise a respective connecting lug 103 by means of which the electrode plates in the positive plate group 114 are connected together into a parallel connection. The negative electrode plates 105 each comprise a respective connecting lug 103 by means of which the electrode plates in the negative plate group 115 are connected together into a parallel connection. The connection can be made by a connector 112 soldered or welded onto the connecting lugs 103 as is recognizable in FIG. 1.

The accumulator 100 according to FIG. 1 can in particular comprise one or more inventive electrode plates, e.g. in the form of positive electrode plates 104.

FIG. 2 shows an example of a positive lead grid 101 in a top plan view. It can be seen that the lead grid 101 has a plurality of grid bars 114, between which is a plurality of window-like cutouts 113. To make it easier to handle and for purposes of mechanical stability as well as improved electrical properties, the outer edge of the lead grid 101 can exhibit one, some or all of the following cited frame sections: upper frame section 115, left side frame section 119, lower frame section 117, right side frame section 118.

FIG. 3 shows the lead grid 101 from FIG. 2 after having been at least partly covered with active mass, which is usually applied in paste form. This process is also known as pasting. FIG. 4 shows the lead grid 103 of FIG. 3 having been provided with the active mass being inserted into a wrapper-like separator 106.

Figure 5:
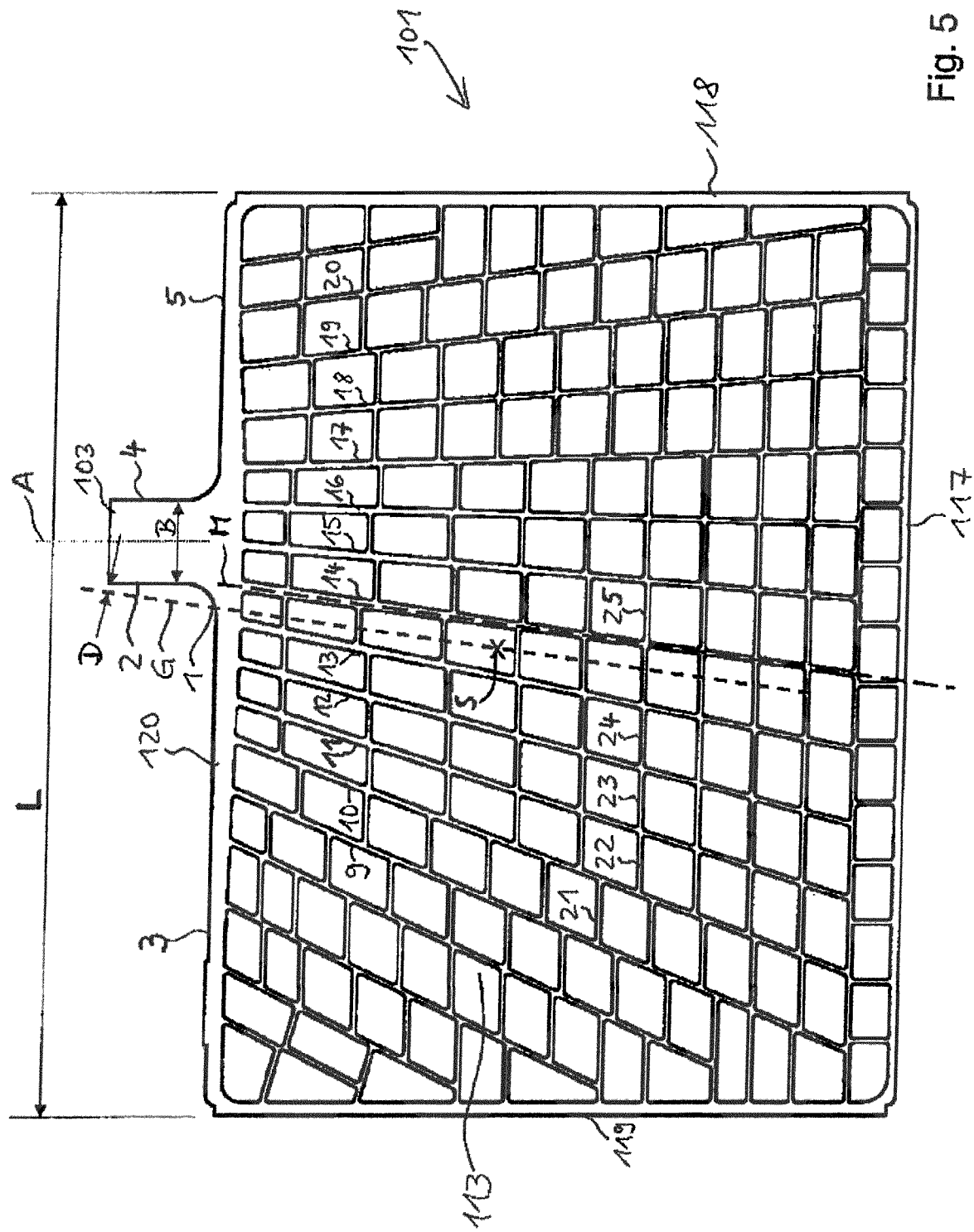
FIG. 5 is a top view of the grid arrangement according to the invention.

FIG. 5 shows a grid arrangement 101 formed according to the invention, again comprising a frame having an upper frame element 120, a lower frame element 117, a right side frame element 118 and a left side frame element 119. The grid 113 is situated within the area enclosed by the above-cited frame elements. As can be seen, the connecting lug 103 disposed on the upper frame element 120 is arranged asymmetrically on the upper frame element 120, somewhat to the right of the grid arrangement center. A vertical central axis A running exactly vertical intersects the center of the connecting lug 103. The vertical central axis A thereby also serves as a vertical reference axis.

Further reference numerals are provided in FIG. 5 to specify the grid 113 in greater detail. The grid 113 comprises a plurality of horizontal bars; of these, horizontal bars 21 to 25 have been provided with reference numerals for illustrative purposes. The horizontal bars extend substantially horizontally. Vertical bars intersect or cross or are tangent to the horizontal bars. Of the vertical bars, vertical bars 9 to 20 have been provided with reference numerals for illustrative purposes. The vertical bars do not run exactly vertically but rather at different angles to each other in the shape of a fan, whereby they radiate outwardly from the upper frame element 120. The vertical bars identified by reference numerals 9 to 20 intersect both the upper frame element as well as, at least in a mathematical extension, the lower frame element 117. Further vertical bars arranged to the left and right thereof, which are not provided with reference numerals, do not intersect the lower frame element 117, not even in a mathematical extension.

It is provided with the grid arrangement according to the invention for the sum of all the angles of the vertical bars 9 to 20; i.e. the vertical bars intersecting both the upper as well as the lower frame element of the grid arrangement, or at least intersecting in mathematical extension, to be greater than 7°. The angles are defined here with respect to the vertical reference axis A. This results in the sum of all the angles being approximately equivalent to the intersecting angle of central axis M with vertical reference axis A. In other words, the angle of inclination to the vertical reference axis A yielded by the summation is a value greater than 7°.

In corresponding manner, the inventive grid arrangement also exhibits a value greater than 7°, again relative to the vertically extending reference axis A, with respect to the sum of the angles of the outermost left vertical bar 9 and the outermost right vertical bar 20 which intersect both the upper and well as the lower frame element of the grid arrangement, or at least would intersect in mathematical extension.

The connecting lug 103 has a first vertical side 2 arranged on the side of the longer leg 3 of the upper frame element 120. An opposite second vertical side 4 is arranged on the side of the shorter leg 5 of the upper frame element 120. The legs 3, 5 are formed to the respective left and right of the connecting lug 103.

The center of gravity S is plotted in the grid arrangement according to FIG. 5. Vertical bar 14 is the vertical bar situated closest the center of gravity S; i.e. the vertical bar having the least distance from the center of gravity S. The central axis M of vertical bar 14 is also plotted in FIG. 5. A parallel to central axis M running through the center of gravity S is further plotted as straight line G. Said straight line G passes the connecting lug 103 on the first vertical side 2 at a distance D. In the grid arrangement according to the invention, the straight line G can also intersect the connecting lug 103, particularly in the area of the first vertical side 2. The intersecting point can also be situated at other locations on the connecting lug 103, ranging to the second vertical side 4 of the connecting lug 103 opposite from the first vertical side 2.

It can further be provided in the inventive grid arrangement for a point 1 at which the straight line G intersects the upper frame element 120 to be situated at a distance less than 15%, in particular less than 10% of the length L of the upper frame element 120 from the vertical central axis A of the connecting lug 103. The length L of the upper frame element 120, which also concurrently corresponds to the width of the grid arrangement 101, is plotted in FIG. 5. The width B of the connecting lug 103 is likewise plotted.

FIG. 6 shows a further inventive grid arrangement 101 having a narrower structure than the embodiment according to FIG. 5. The length L of the upper frame element is thus shorter than in the embodiment according to FIG. 5. Because of the shorter total width, the grid arrangement 101 according to FIG. 6 has fewer vertical bars. Among the vertical bars, only vertical bars 9, 10, 11, 14, 17, 18, 19 and 20 intersect the upper frame element and, at least in mathematical extension, also the lower frame element 117. Of this subset of vertical bars, vertical bar 9 is again the outermost left vertical bar and vertical bar 20 the outermost right vertical bar. Further vertical bars not provided with reference numerals are arranged to the left and right of this subset of vertical bars and also do not intersect the lower frame element 117 in extension. In the embodiment according to FIG. 6, vertical bar 14 is again the vertical bar situated closest to the center of gravity S of the grid arrangement 101.

The reference numerals of FIG. 6 otherwise correspond to those of FIG. 5.

To aid in identification, FIG. 6 also separately plots, to the right of the grid arrangement, the arrangement of the center of gravity S, central axis M and straight line G as well as the distance D from the connecting lug 103 without the grid bars. The course of straight line G in the left part of FIG. 6 is somewhat hard to distinguish due to part of it running along the edge of vertical bar 14.

The embodiments according to FIGS. 5 and 6 document the universal applicability of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. An electrochemical accumulator, wherein the accumulator comprises:
a frame including an upper element having a connecting lug for a battery electrode, wherein the connecting lug is offset from a center of gravity of the accumulator;
a grid arranged on the frame, wherein the grid includes:
a plurality of substantially horizontal bars; and
a plurality of substantially vertical bars, wherein each of the substantially vertical bars is positioned at an angle directed toward the connecting lug, and wherein one of the plurality of the vertical bars has a central axis, wherein a sum of all of the angles of the plurality of vertical bars is equivalent to an intersecting angle of the central axis with a vertical reference axis.

2. The electrochemical accumulator of claim 1, wherein the intersecting angle of the central axis with the vertical reference axis is greater than 7°.

3. The electrochemical accumulator of claim 1, wherein the connecting lug is arranged on a longer leg of the upper element of the frame.

4. The electrochemical accumulator of claim 1, wherein a straight line passing through the center of gravity and parallel to the central axis is offset from the central axis by a first distance.

5. The electrochemical accumulator of claim 4, wherein the straight line passes the connecting lug and the first distance is less than 15% of a width of the connecting lug.

6. The electrochemical accumulator of claim 5, wherein the first distance is less than 10% of the width of the connecting lug.

7. The electrochemical accumulator of claim 4, wherein the straight line, intersects the upper element of the frame and the first distance is less than 15% of a length of the upper element away from a vertical central axis of the connecting lug.

8. The electrochemical accumulator of claim 7, wherein the straight line, intersects the upper element of the frame and the first distance is less than 10% of the length of the upper element away from a vertical central axis of the connecting lug.

9. The electrochemical accumulator of claim 1, wherein an angle of one vertical bar relative to an adjacent vertical bar is less than 5°.

10. An electrochemical accumulator, wherein the accumulator comprises:
a frame including, at least an upper portion having a connecting lug and opposing side portions, wherein the connecting lug is offset on the upper portion such that a first side of the upper portion is longer than a second side of the upper portion;
a grid arranged on the frame, wherein the grid includes:
a plurality of substantially horizontal bars; and
a plurality of substantially vertical bars, wherein the vertical bars extend radially from the connecting lug, and wherein a portion of the horizontal bars adjacent the opposing side portions of the frame are offset relative to another portion of the horizontal bars in a central portion of the grid; and
wherein a straight line through a center of gravity of the grid and parallel to a central axis of one of the plurality of vertical bars is offset from the central axis by a first distance, and wherein the straight line passes the connecting lug with the first distance being less than 15% of a width of the connecting lug.

11. The electrochemical accumulator of claim 10, wherein an intersecting angle of the central axis with a vertical reference axis is greater than 7°.

12. The electrochemical accumulator of claim 10, wherein the connecting lug is arranged on the first side of the upper portion of the frame.

13. The electrochemical accumulator of claim 10, wherein the first distance is less than 10% of the width of the connecting lug.

14. The electrochemical accumulator of claim 10, wherein the straight line intersects an upper frame element and the first distance is less than 15% of a length of the upper frame element away from a vertical central axis of the connecting lug.

15. The electrochemical accumulator of claim 14, wherein the straight line intersects an upper frame element and the first distance is less than 10% of the length of the upper frame element away from the vertical central axis of the connecting lug.

16. The electrochemical accumulator of claim 10, wherein an angle of one vertical bar relative to an adjacent vertical bar is less than 5°.

17. The electrochemical accumulator of claim 10, wherein at least a portion of the substantially horizontal bars is positioned at an angle relative to an adjacent horizontal bar.

18. The electrochemical accumulator of claim 17, wherein the portion of substantially horizontal bars positioned at an angle is substantially perpendicular to an adjacent substantially vertical bar.

* * * * *